INVENTOR
Dierick Kossel
BY Benj. J. Rauber
his attorney

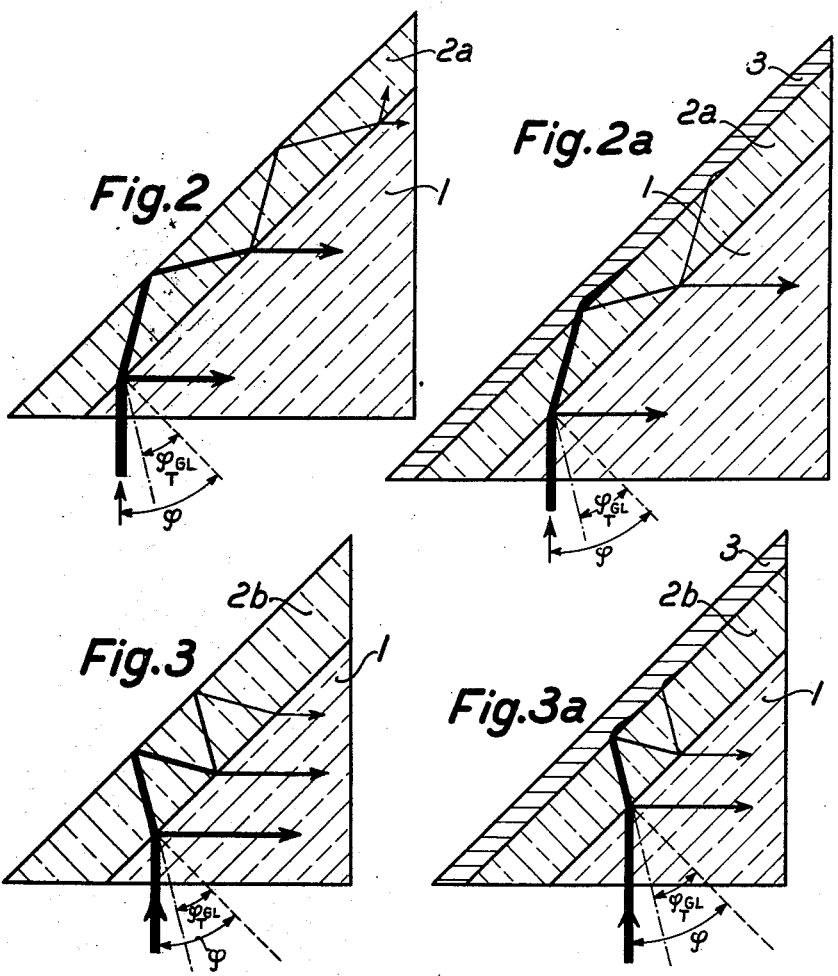

INVENTOR.
DIERICK KOSSEL
BY
ATTORNEY

United States Patent Office 3,043,976
Patented July 10, 1962

3,043,976
PHOTOCATHODE FOR PHOTOCELLS, PHOTO-
ELECTRIC QUADRUPLER AND THE LIKE
Dierick Kossel, Wetzlar (Lahn), Germany, assignor to
Ernst Leitz, G.m.b.H., Wetzlar (Lahn), Germany, a corporation of Germany
Filed Jan. 14, 1959, Ser. No. 786,847
Claims priority, application Germany Jan. 18, 1958
8 Claims. (Cl. 313—94)

My invention relates to photocathodes for photocells, photoelectric quadruplers and the like.

In the co-pending U.S. patent application Serial No. 369,606, now Patent No. 2,972,691, granted February 2, 1961, photocathodes are described.

My present invention improves a photocathode as described in the above mentioned patent application by superposing on a transparent carrier, for example, one of transparent glass an intermediate transparent interference layer and by superposing on this interference layer a cathode layer, the light entering the system through the carrier and the cathode layer being the last layer in the path of the impinging light.

It has been established by experiment that the said photocathode has an efficiency 60 times that of an ordinary photocathode.

My invention further improves the efficiency of the said photocathode by utilizing the angle of total reflexion. This can be accomplished by shaping the side of the carrier reverse to the direction of the impinging light in such a manner that the impinging light rays form an angle $\varphi$ to the normal on the reverse side of the carrier at its interface with the intermediate layer, the angle $\varphi$ being larger than the angle of total reflection of the carrier when bordering upon air.

At a simple photocathode this can be achieved by shaping the carrier like a prism having the necessary prism angle. It also is possible to provide the reverse side of the carrier which borders upon the intermediate layer with a pyramidic or conic screen or with prismatic gable ribs.

In this case however it is necessary to provide the side of the intermediate layer reverse to the carrier with a like screen. With regard to the discharge-depths of the discharged electrons, the photoelectric layer should be manufactured thin enough so that practically all electrons will be discharged from the layer. With extremely thin photoelectric layers it will be suitable to use an electric-conductive material for the intermediate layer.

The invention is illustrated by way of example in the accompanying drawings in which FIG. 1 is a section of a glass plate used as a carrier of the photoelectric cathode with prismatic gable ribs;

FIGS. 2 and 3 are sections of the carrier and interference layer in which the interference layer has an index of refraction smaller than that of the carrier;

FIGS. 2a and 3a are sections of the carrier and interference layer in which the interference layer has an index of refraction larger than that of the carrier;

Figure 4:
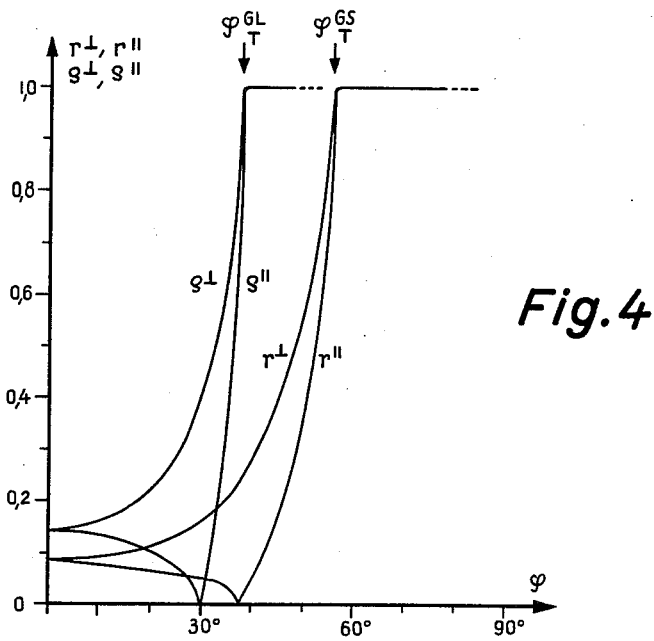
FIGS. 4 and 5 are diagrams showing the coefficients of certain functions at various angles of incidence of the light on the carrier.

In the drawings the carrier is marked 1 and the interference layer is marked 2a (when the index of refraction is smaller than that of the carrier) or 2b (when the index of refraction is larger than that of the carrier) and the absorbing photo-electric layer is marked 3. The angle between the impinging light rays and the normal on the side of the carrier 1 bordering upon the interference layer 2a, 2b, respectively is marked $\varphi$ and the angle of total reflection of the carrier bordering upon air is marked $\varphi_T{}^{GL}$. As can be seen from the schematic drawings all of the impinging light is totally reflected in the cases of FIG. 2 and FIG. 3, whereas in the cases of FIG. 2a and FIG. 3a the impinging light is totally absorbed, due to the suitable thickness of the layer 2a and 2b respectively.

Figure 6:
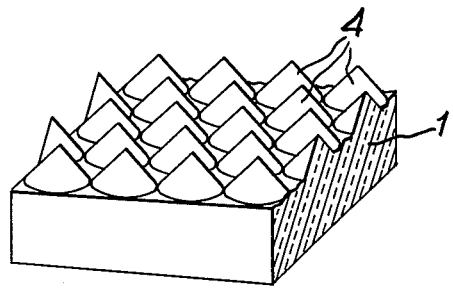
FIG. 6 is a perspective view of a portion of a carrier having a conical screen surface.

FIG. 6 shows a carrier 1 having conical projections 4 on the surface on which the interference layer and the photoelectric layer are based. These layers are not shown because their thickness is extremely small as, for example, 1 micron or one-millionth of a meter for the light absorbing layer, and of about 2½ microns for the interference layer, whereas the carrier itself would have a thickness of a total depth from the receiving surface to the apex of the pyramid of about one centimeter or about one-half centimeter from the distance of the base to the peak of the cones. It would, therefore, be impossible on a figure of the size shown in the drawing to illustrate the relative thicknesses of the interference layer and the light absorbing layer.

Figure 7:
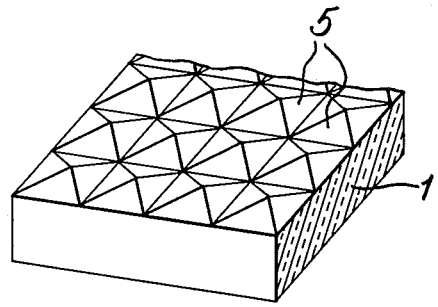
FIG. 7 is a similar perspective view of a portion of a carrier having a pyramidal screen surface.

In the form shown in FIG. 7 the surface of the carrier 1 on which the interference and light absorbing layers are carried has pyramidal projections 5.

Figure 8:
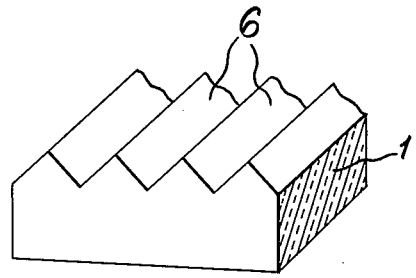
FIG. 8 is a perspective view of a portion of a carrier having a prismatic gable screen surface.

In the modification shown in FIG. 8 the surface on which the interference layer and light absorbing layer are mounted is in the form of gables 6.

The invention is based upon the following: If a bundle of light impinges on the reverse side of a glass carrier having the index of refraction $n_g$ and having superposed thereon a transparent intermediate layer having an index of refraction $n_s$ then a part of the bundle of light will be reflected from the interface between the glass carrier and the intermediate layer and—in case the angle of incidence is larger than the angle of total reflection of the glass carrier—the rest of the bundle of light will be totally reflected from the interface between the intermediate layer and air. This is true when $$n_s < n_g \text{ for the sector } \varphi_T{}^{GL} < \varphi < \varphi_T{}^{GS}$$

and when $$n_s > n_g \text{ for the sector } \varphi_T{}^{GL} < \varphi$$

wherein $\varphi_T{}^{GL}$, $\varphi_T{}^{GS}$ respectively, mean the angle of total reflection on the interface between the glass carrier and air and between the glass carrier and the intermediate layer.

In case the transparent intermediate layer on the glass carrier is thin enough, interference will occur between the bundle of light being reflected from the interface between the glass carrier and the intermediate layer and the bundles of light being reflected to and fro between the borders of the intermediate layer. The function of interference for the intensity of the reflected light R is represented by (1) $$R = \frac{r^2 + \rho^2 + 2r\rho \cdot \cos(\Delta + \alpha + \beta)}{1 + r^2\rho^2 + 2r\rho \cdot \cos(\Delta + \alpha + \beta)}$$

(see D. Kossel: "Interference at layers with totally reflecting boundaries, Z. S. Phys., vol. 126 (1949), page 233).
In this formula:

$r$ = coefficient of the amplitude of reflection when reflection occurs from the interface between the glass carrier and the intermediate layer
$\alpha$ = phase shift when reflection occurs from the interface between the glass carrier and the intermediate layer
$\rho$ = coefficient of the amplitude of reflection when the reflection occurs from the interface between the intermediate layer and air
$\beta$ = phase shift when the reflection occurs from the interface between the intermediate layer and air
$\Delta$ = the optical difference of path between the bundles of light of wave-length $\lambda$ reflected from the interface between the glass carrier and the intermediate layer and from the interface between the intermediate layer and air respectively, produced by the intermediate layer of the thickness $d$.

(2) $$\Delta = \frac{2\pi}{\lambda} \cdot 2d \cdot \sqrt{n_S^2 - n_G^2 \cdot \sin^2 \varphi}$$

The coefficients, $r$, $\alpha$, $\rho$, $\beta$ are different for light polarized perpendicularly and parallel respectively and can be calculated by using Fresnels formulas.

In FIG. 4 as an example, the functions are shown diagrammatically for $r^\perp$, $r^{||}$, $\rho^\perp$, $\rho^{||} = f(\varphi)$, the index of refraction $n_g$ being 1.60 and the index of refraction $n_s$ being 1.33. The function of interference for light polarized perpendicular and parallel respectively will be found according to Formula 1

$$R^\perp = f(r^\perp, \rho, {}^\perp\alpha^\perp, \beta^\perp, d, n_s, n_g)$$
$$R^{||} = f(r^{||}, \rho^{||}, \alpha^{||}, \beta^{||}, d, n_s, n_g)$$

From the functions of interference $R^\perp$ and $R^{||}$, respectively it can be calculated according to Formula 1 that $R^\perp$ and $R^{||}$ will always amount to 1 in case $\varphi$ is larger than $\varphi_T^{GL}$ i.e. $R^\perp$ and $R^{||}$ is equal to 1.

This means that no interference is possible if total reflection occurs on either side of the intermediate layer. However, in case a thin absorbing layer also having, for instance, photo-electric qualities is further superposed on the dielectric intermediate layer, the total reflection is disturbed in the sector $\varphi > \varphi_T^{GL}$.

If the capability of reflection modified by the absorbing photo-electric layer is designated by $\rho_A^\perp$ and $\rho_A^{||}$ respectively then $\rho_A^\perp$ and $\rho_A^{||}$ respectively are smaller than 1 in the sector $\varphi_T^{GL} < \varphi < 90°$.

For the problem solved by the invention it is essential that the transparency of the assembly of carrier-dielectric intermediate layer-absorbing photoelectric layer always equals 0 in the sector $\varphi > \varphi_T^{GL}$.

Independently of the thickness, the index of refraction and the capability of absorption of the used substances, the part of light not being reflected will be absorbed. Should $\rho_A$ and $\rho_A^{||}$ however be smaller than 1, then the function of interference $R = f(\varphi)$ and $R^{||} = f(\varphi)$, respectively will differ from 1 in the sector $\varphi_T^{GL} < \varphi < \varphi_T^{GS}$ (see Formula 1). If the factor $\cos(\Delta + \alpha^\perp + \beta_A^\perp)$ equals 1, that is, if $\Delta + \alpha^\perp + \beta_A$ equals $2n\pi$ ($n$ being 0, 1, 2 . . .) then $$R^\perp = R^\perp_{max.} = \left(\frac{r^\perp + \rho_A^\perp}{1 + r^\perp \rho_A^\perp}\right)^2$$

$$R^{||} = R^{||}_{max.} = \left(\frac{r^{||} + \rho_A^{||}}{1 + r^{||} \rho_A^{||}}\right)^2$$

If the factor $\cos(\Delta + \alpha_T + \beta_{AT})$ equals $-1$ i.e. if $\Delta + \alpha^\perp + \beta_A^\perp = (1 + 2n)\pi$, ($n$ being 0, 1, 2 . . .), then $$R^\perp = R^\perp_{min.} = \left(\frac{r^\perp - \rho_A^\perp}{1 - r^\perp \rho_A^\perp}\right)^2$$

$$R^{||} = R^{||}_{min.} = \left(\frac{r^{||} - \rho_A^{||}}{1 - r^{||} \rho_A^{||}}\right)^2$$

This means however, that $R^\perp$ and $R^{||}$, respectively, equal 0 in all cases of $r^\perp = \rho_A^\perp$ and $r^{||} = \rho_A$ respectively. But if no light is reflected, then all of it must be absorbed, that is $A^\perp$ and $A^{||}$, respectively, equal 1.

Figure 5:
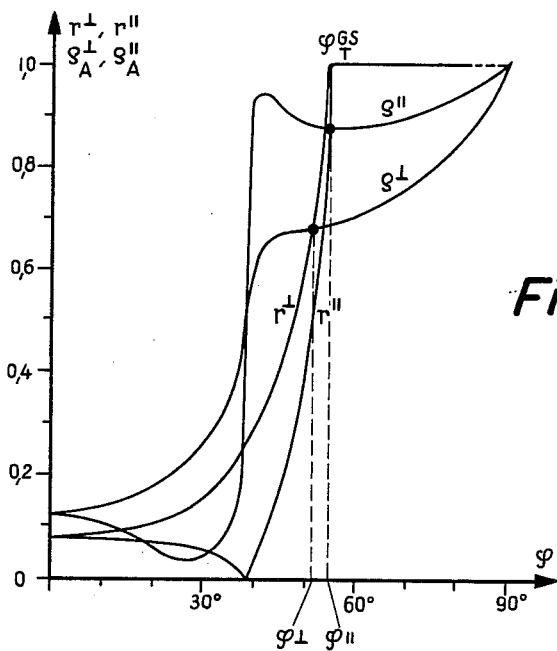

FIG. 5 shows diagrammatically the value of $r^\perp$, $r^{||}_T$, $\rho_A$, and $\rho_A$ being a function of $\varphi$ corresponding to FIG. 4. It should especially be noticed that the values of $\rho_A^\perp$ and $\rho_A^{||}$, respectively, depend on the capability of absorption of the photo-electric layer in the sector $\varphi > \varphi_T^{GL}$. In any case however the values are smaller than 1, i.e. there are always two angles $\varphi^\perp$ and $\varphi^{||}$ for which $r^\perp$ equals $\rho_A^\perp$ and $r^{||}$ equals $\rho_A^{||}$, respectively.

Having calculated the angles $\varphi_T$ and $\varphi^{||}$, respectively, in the manner described above it will be found possible to meet the conditions of Formula 3 by choosing the value of the factor $d$ of Formula 2 accordingly.

Following the calculation described above, the coefficient of absorption of the photoelectric layer can theoretically be chosen as small as one likes. It is suitable, however, to choose the material of the photoelectric layer in such a way that the value of $\varphi_A$ becomes as small as possible, since this results in the half-width of the minimum of reflection being as large as possible. This is essential in order to obtain a high gain of electrons even from a bundle of light of a wide aperture.

Moreover it was found suitable to insert at least one more transparent layer known per se in order to increase or to diminish the capability of reflection from the interface between the carrier and the intermediate layer.

Having described my invention, what I claim is:

1. Photoelectric cathode for photocells, quadruplers and the like using an interference system comprising a transparent carrier, an interference intermediate layer and a thin photoelectric cathode layer, the cathode layer being the last layer in the direction of movement of the impinging light and the interfaces between the carrier and intermediate layer and between the intermediate layer and the cathode layer being at an angle to the free face of the carrier.

2. Photoelectric cathode comprising a transparent carrier, an interference intermediate layer and a thin photoelectric cathode layer, the carrier being prism-shaped, the angle of reflection being larger than the angle of total reflection of the material of the carrier when bordering upon air.

3. Photoelectric cathode comprising a transparent carrier, an interference intermediate layer and a thin photoelectric cathode layer, the reverse side of the carrier from the direction of the impinging light having a pyramidic screen, the basic angles of the pyramids being larger than the angle of total reflection of the material of the carrier when bordering upon air.

4. Photoelectric cathode comprising a transparent carrier, an interference intermediate layer and a thin photoelectric cathode layer, the reverse side of the carrier from the direction of the impinging light having a conic screen, the basic angles of the cones being larger than the angle of total reflection of the material of the carrier when bordering upon air.

5. Photoelectric cathode comprising a transparent carrier, an interference intermediate layer and a thin photoelectric cathode layer, the reverse side of the carrier from the direction of movement of the impinging light having a prismatic gable screen, the basic angles of the gable-prims being larger than the angle of total reflection of the material of the carrier when bordering upon air.

6. The photoelectric cathode of claim 1 in which the index of refraction of the material of the carrier is larger than the index of refraction of the material of the intermediate layer.

7. The photoelectric cathode of claim 1 in which the index of refraction of the material of the carrier is smaller than the index of refraction of the material of the intermediate layer.

8. The photoelectric cathode of claim 1 in which the intermediate layer consists of an electric conductive material.

References Cited in the file of this patent
UNITED STATES PATENTS

| | | |
|---|---|---|
| 2,359,694 | Turner | Oct. 3, 1944 |
| 2,447,828 | West | Aug. 24, 1948 |
| 2,677,714 | Auwarter | May 4, 1954 |
| 2,739,243 | Sheldon | Mar. 20, 1956 |
| 2,869,010 | Gray | Jan. 13, 1959 |
| 2,875,359 | Cope | Feb. 24, 1959 |